United States Patent
Wilson et al.

(10) Patent No.: US 9,978,228 B2
(45) Date of Patent: May 22, 2018

(54) SYSTEMS AND METHODS FOR HOME AUTOMATION INTEGRATION WITH A DOORBELL

(71) Applicant: Echostar Technologies L.L.C., Englewood, CO (US)

(72) Inventors: Daniel Wilson, Acworth, GA (US); Roopkumar Parthasarathy rao, Alpharetta, GA (US)

(73) Assignee: ECHOSTAR TECHNOLOGIES INTERNATIONAL CORPORATION, Englewood, CO (US)

( * ) Notice: Subject to any disclaimer, the term of this patent is extended or adjusted under 35 U.S.C. 154(b) by 0 days. days.

(21) Appl. No.: 15/414,290

(22) Filed: Jan. 24, 2017

(65) Prior Publication Data

US 2017/0132886 A1 May 11, 2017

Related U.S. Application Data

(63) Continuation of application No. 15/184,522, filed on Jun. 16, 2016, now Pat. No. 9,589,430, which is a
(Continued)

(51) Int. Cl.
*G08B 3/00* (2006.01)
*G10K 1/00* (2006.01)
(Continued)

(52) U.S. Cl.
CPC ............... *G08B 7/06* (2013.01); *G08B 3/10* (2013.01); *G10K 1/064* (2013.01)

(58) Field of Classification Search
CPC ........ G08C 17/02; G08B 3/10; G08B 3/1016; G08B 1/08; G08B 25/10; G10K 1/064;
(Continued)

(56) References Cited

U.S. PATENT DOCUMENTS 4,523,193 A * 6/1985 Levinson ............... G08B 3/10
340/12.5
4,764,953 A * 8/1988 Chern .................. H04M 11/025
379/102.06

(Continued)

*Primary Examiner* — Hoi Lau
(74) *Attorney, Agent, or Firm* — Kilpatrick Townsend & Stockton LLP

(57) ABSTRACT

Various doorbell monitoring devices and methods are presented herein. Such arrangements may be configured to be integrated with a previously-installed doorbell and a previously-installed chime unit. A first power source may be configured to power the doorbell monitor device separate from the previously-installed doorbell and the previously-installed chime unit. A plurality of electrical connectors may be present and may be configured to be attached with preexisting terminals of the previously-installed chime unit. An actuation sensor may be present and configured to detect an actuation of the previously-installed doorbell via the two or more electrical connectors. A communication module may also be present and configured to transmit a wireless signal indicative of the ring to a receiver device.

18 Claims, 8 Drawing Sheets

Related U.S. Application Data continuation of application No. 14/480,280, filed on Sep. 8, 2014, now Pat. No. 9,396,624.

(60) Provisional application No. 61/913,683, filed on Dec. 9, 2013.

(51) Int. Cl.
    *G08B 7/06* (2006.01)
    *G08B 3/10* (2006.01)
    *G10K 1/064* (2006.01)

(58) Field of Classification Search
    CPC ............ H04W 1/0291; H04W 1/7253; H04W 11/025; G04N 7/186
    USPC ... 340/392.1, 326, 393.3, 384.7, 392.5, 287, 340/328, 6.1
    See application file for complete search history.

(56) References Cited

U.S. PATENT DOCUMENTS

| | | | | |
|---|---|---|---|---|
| 5,365,214 A * | 11/1994 | Angott | ................. | G08B 1/08 340/328 |
| 5,428,388 A * | 6/1995 | von Bauer | ............ | H04N 7/186 348/155 |
| 5,748,074 A * | 5/1998 | Chomet | ................. | G08B 3/10 340/328 |
| 5,757,267 A * | 5/1998 | Xydis | ..................... | G08B 3/10 340/12.54 |
| 5,894,262 A * | 4/1999 | McCavit | ................. | G08B 3/10 340/328 |
| 6,380,852 B1 * | 4/2002 | Hartman | ............... | H04B 15/02 307/116 |
| 6,414,589 B1 * | 7/2002 | Angott | .................... | G08B 1/08 340/326 |
| 7,023,327 B1 * | 4/2006 | Chen | ....................... | G08B 3/10 340/326 |
| 7,429,924 B2 * | 9/2008 | Langer | .................... | G08B 3/10 340/384.1 |
| 8,780,201 B1 * | 7/2014 | Scalisi | ................... | H04N 7/186 348/143 |
| 8,823,795 B1 * | 9/2014 | Scalisi | ................... | H04N 7/188 348/143 |
| 8,842,180 B1 * | 9/2014 | Kasmir | .................. | H04N 7/186 348/143 |
| 9,058,738 B1 * | 6/2015 | Scalisi | ................... | G08B 25/10 |
| 9,396,624 B2 | 7/2016 | Wilson et al. | | |
| 9,589,430 B2 | 3/2017 | Wilson et al. | | |
| 2012/0306630 A1 | 12/2012 | Gilbert | | |
| 2014/0070922 A1 | 3/2014 | Davis | | |
| 2015/0029335 A1 | 1/2015 | Kasmir et al. | | |

\* cited by examiner

SYSTEMS AND METHODS FOR HOME AUTOMATION INTEGRATION WITH A DOORBELL

CROSS-REFERENCE TO RELATED APPLICATION

This application is a continuation of U.S. application Ser. No. 15/184,522, entitled "Systems and Methods for Home Automation Integration with a Doorbell," filed Jun. 16, 2016, which is a continuation of U.S. application Ser. No. 14/480,280, entitled "Systems and Methods for Home Automation Integration with a Doorbell," filed Sep. 8, 2014, which claims priority to U.S. Application 61/913,683, entitled "Systems and Methods for Monitoring a Doorbell," filed Dec. 9, 2013, the entire disclosures of which are incorporated herein by reference for all purposes.

BACKGROUND

Hearing a doorbell ring (buzz, chime, or otherwise sound) is not always possible. If a person is in a different room from the doorbell chime unit and/or is exposed to significant environmental sound (e.g., a nearby television is blaring), hearing the doorbell may be difficult. Further, when away from home, it may be useful for a person to know the doorbell has been pressed, such as for safety, receipt of deliveries, missed calls, etc.

SUMMARY

Various embodiments of a doorbell monitor device are presented. In some embodiments, doorbell monitor device configured to be integrated with a previously-installed doorbell. Such a monitor device may include a first power source configured to power the doorbell monitor device separate from the previously-installed doorbell and the previously-installed chime unit. The monitor device may include a plurality of electrical connectors configured to be attached with preexisting terminals of the previously-installed chime unit. The monitor device may include an actuation sensor configured to sense an actuation of the previously-installed doorbell via the plurality of electrical connectors. The monitor device may include a communication module configured to transmit a wireless signal indicative of the actuation to a receiver device. The monitor device may include a housing, configured to encase the first power source, the actuation sensor, and the communication module, wherein the housing is configured to be placed within the previously-installed chime unit and is configured to permit the plurality of electrical connectors to be attached with the preexisting terminals of the previously-installed chime unit.

Embodiments of such a doorbell monitor device may include one or more of the following features: The plurality of electrical connectors may comprise three electrical connectors, the three electrical connectors including: a first electrical connector configured to be attached to a first terminal associated with the previously-installed doorbell; a second electrical connector configured to be attached to a second terminal associated with a second previously-installed doorbell; and a third electrical connector configured to be attached to a third terminal associated with a second power source of the previously-installed chime unit. The actuation sensor may be further configured to sense a second actuation of the second previously-installed doorbell based on the second electrical connector and the third electrical connector. The communication module may be further configured to transmit a second wireless signal indicative of the second actuation to the receiver device, the second wireless signal being different from the wireless signal. The doorbell monitor device may include a power converter, configured to: convert a half-wave signal existing between the first electrical connector and the third electrical connector into a direct current voltage; and convert a half-wave signal existing between the second electrical connector and the third electrical connector into the direct current voltage. The actuation sensor may be configured to sense actuations of electronic-type doorbell circuits and solenoid type doorbell circuits. The actuation sensor may include a light filter configured to eliminate false detection of activations caused by a lit light of the previously-installed doorbell. The actuation sensor may include a first comparator circuit and a second comparator circuit, wherein: the first comparator circuit is configured to monitor a first voltage differential; and the second comparator circuit is configured to monitor a second voltage differential. The actuation sensor may include: a first comparator circuit, a second comparator circuit, a third comparator circuit, and a fourth comparator circuit, wherein: the first comparator circuit is configured to monitor a first voltage differential related to the previously-installed doorbell; the second comparator circuit is configured to monitor a second voltage differential related to the previously-installed doorbell; the third comparator circuit is configured to monitor a third voltage differential related to the second previously-installed doorbell; and the second comparator circuit is configured to monitor a fourth voltage differential related to the second previously-installed doorbell. Such doorbell monitor device may include a power module configured to sense that a circuit electrically connected with the previously-installed doorbell supplies a voltage sufficient to power the doorbell monitor device. The power module may be further configured to, based on the voltage being sensed as sufficient, electrically disconnect the first power source from the actuation sensor and the communication module. The power module may be further configured to detect that the circuit electrically connected with the previously-installed doorbell does not supply a sufficient voltage to power the doorbell monitor device. The power module may be further configured to, based on the voltage being detected as insufficient, electrically connect the first power source to the actuation sensor and the communication module. The power module may be further configured to disconnect the first power source based on a reverse polarity of the first power source being present. The communication module may include an antenna; and an IEEE 802.15 standard-based communication controller.

In some embodiments, a method for installing and/or using a monitor device is presented. The method may include accessing an interior of a previously-installed chime unit. The method may include electrically connecting a plurality of electrical connectors of the doorbell monitor device to one or more existing terminals of the previously-installed chime unit. The method may include closing the previously-installed chime unit with the doorbell monitor device inside. The method may include sensing, by the doorbell monitor device, whether a voltage supplied via the one or more existing terminals of the previously-installed chime unit is sufficient to power the doorbell monitor device

DETAILED DESCRIPTION

Many structures, such as homes, buildings, apartments, condominiums, warehouses, RVs, or any other place where the use of a doorbell is beneficial, have wired doorbells installed. Such doorbells typically include a button (or other form of actuator) that can be actuated by a person to trigger a ring. Such doorbells may also include a chime unit which creates the ring (which, generally, can be any type of sound), a power source to power the doorbell (e.g., a lighted button) and the chime unit, and wiring to electrically connect the doorbell, chime unit, and the power source. Such an arrangement may be limited in that a person in the structure may only hear the doorbell ring if within auditory range of the sounds created by the chime unit when the doorbell's button is actuated. Such range may be substantially affected by environmental noise. For instance, if a person is in another room, such as watching television, the sound of the television may obscure the sound of the doorbell ring.

A person may benefit from being alerted in more ways than just a simple ring by the chime unit of the doorbell system. However, rewiring, uninstalling, or otherwise substantially modifying the person's current doorbell installation may be beyond the capability and/or motivation of the person. For instance, while the person may desire to be notified of the doorbell ring via multiple methods, the person may not desire to install a new doorbell or chime unit, or perform any significant modification that requires an electrician (e.g., rewiring of the doorbell system). Further, such a person may have little knowledge of his or her installed wired doorbell system. For instance, some doorbell systems are electronic type while others are solenoid type, as detailed herein.

Figure 1:
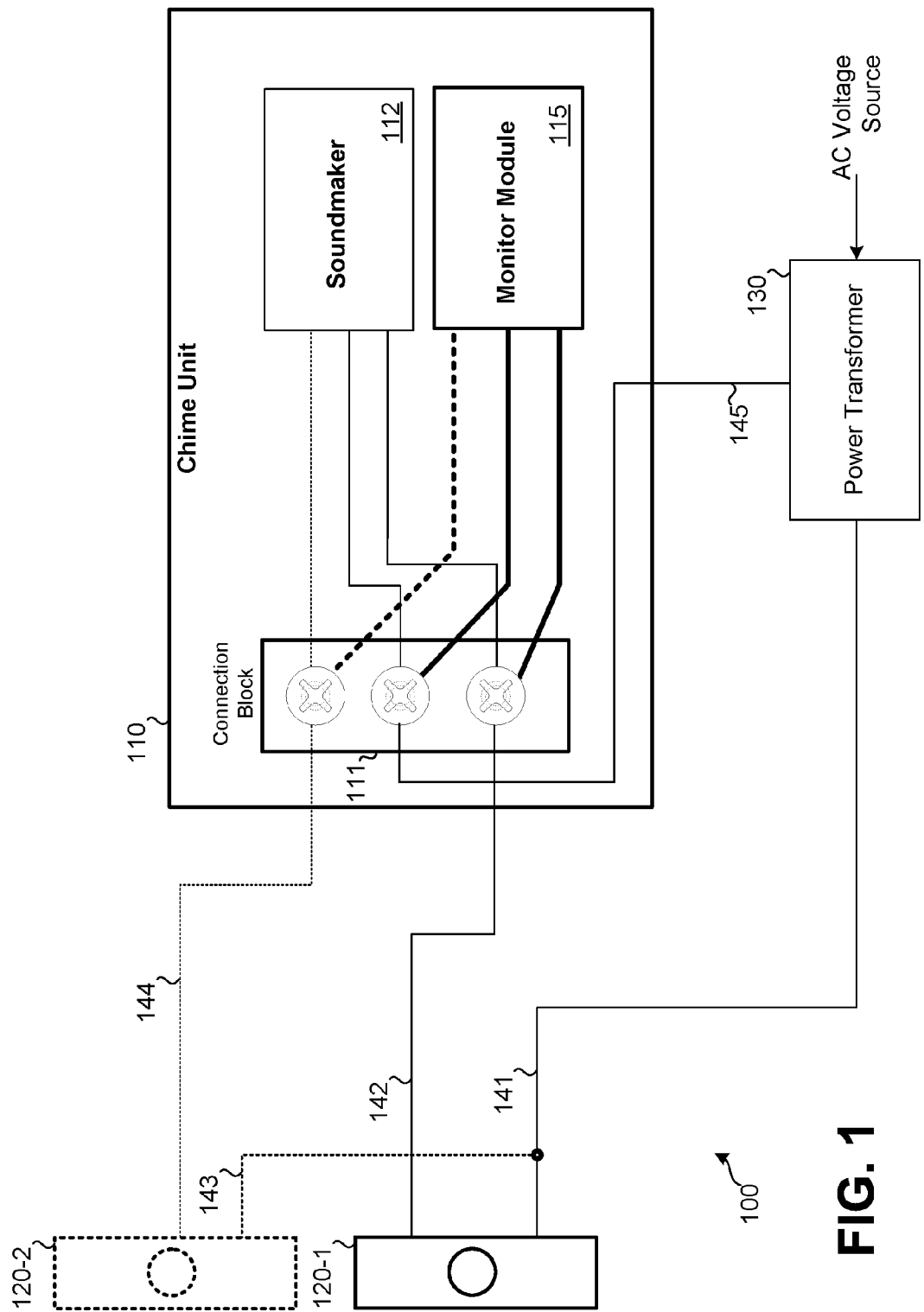
FIG. 1 illustrates an embodiment of a doorbell monitor system that is integrated with a chime unit.

FIG. 1 illustrates an embodiment of a doorbell monitor system 100. Doorbell monitor system 100 may allow for integration of a monitor module 115 with an existing doorbell system, which may be hardwired. Installation of doorbell monitor system 100 may not require any adjustment to the already-installed wiring between chime unit 110, doorbells 120, and power transformer 130. Doorbell monitor system may include: chime unit 110, doorbells 120, power transformer 130, and monitor module 115.

Doorbell monitor system 100 may include one or more doorbells. Doorbell monitor system 100 may be either an electronic-type doorbell system or a solenoid-type doorbell system. In both electronic-type and solenoid-type doorbell circuits, a transformer may cause an AC electrical signal, such as of 16 V, to be transmitted to each doorbell via wiring. An electronic-based doorbell system typically involves a diode being present at the doorbell. When the doorbell is not actuated, the diode may cause the AC electrical signal to only be returned as half-wave signal (e.g., with either the positive or negative portion of the AC wave removed) via the wiring. When the doorbell is depressed or otherwise actuated, the diode may be bypassed thus allowing transmission of the full-wave AC electrical signal to be returned via the wiring. The chime unit in an electronic-type doorbell system may be configured to be powered off of a half-wave signal such that the chime unit can produce a sound whether the actuator of the doorbell is or is not depressed (thus, for example, allowing the sound to continue being generated by the chime unit following the actuator of the doorbell being released). For instance, a one second push of the doorbell may trigger a ten second sound (e.g., a melody) to be played by the electronic doorbell system's chime unit. An electronic doorbell system may typically have a sufficient amount of power present at its terminals to power a monitor module due to the installed diode.

A solenoid type doorbell system may only actuate the chime unit on the circuit being closed (e.g., the doorbell's button being depressed). The AC signal created by the transformer may terminate at the doorbell when unactuated because it functions as an open switch (possibly with a small currently passed through to illuminate a light of the doorbell). When the doorbell is actuated, the doorbell switch may be closed, allowing the AC signal to return via the household wiring and completing the circuit. For instance, the circuit closing may cause a bell or one or more chime bars to be rung by the bell's clapper. This type of signal may be referred to as a "solenoid type" doorbell system because when the circuit is completed, a solenoid present in the chime unit functions as an electromagnet that physically moves a clapper or other form of core (e.g., an iron core) to physically strike an object to make a sound. When the doorbell button is released, the circuit may open, and a final ring may sound that is caused by the clapper releasing from the energized position and striking the bell or tone bar. A solenoid type doorbell system may typically not have enough power present at its terminals to power a monitor module because the circuit is typically fully open (unlike the half-wave present throughout the electronic type doorbell system's circuit when the doorbell is unactuated).

A single doorbell 120-1 may be wired to chime unit 110. In other embodiments, a doorbell 120-2 (e.g., at a side door) may also be wired to chime unit 110. In still other embodiments, more than two doorbells may be wired to chime unit 110. Doorbells 120 may function by closing or interrupting a circuit when a button of the doorbell (or some other actuator) is actuated. Therefore, when doorbell 120-1 is actuated, regardless of whether the doorbell system is electronic-based or a solenoid type, the circuit including wires 141 and 142 may be completed or broken. In the case of an electronic-type doorbell, "completed" may refer to a diode being bypassed to allow a full AC wave signal to pass through the circuit. Similarly, for doorbell 120-2, when actuated, the circuit involving wires 144 and 143 (which may be coupled directly to power transformer 130 or may be coupled to power transformer via wire 141) may be completed or broken. A doorbell of doorbells 120 may include a light and may include a diode installed with various polarities. Such a light, such as an incandescent bulb, may be present in the button of doorbells 120 to assist in a user locating the button in the dark.

Power may be supplied to doorbells 120 and chime unit 110 by power transformer 130. Power transformer 130 may be connected with an AC power source (e.g., household wiring). Power transformer 130 may reside outside chime unit 110 or may be integrated within chime unit 110. Power transformer 130 may convert an AC voltage source to a lower voltage AC voltage, such as 16 Volts. If external to chime unit 110, power transformer 130 may be electrically coupled with chime unit 110 via wire 145. If internal to chime unit 110, power transformer 130 may also be electrically connected with a terminal on connection block 111. In some embodiments, chime unit and doorbells 120 may be battery powered or powered by some alternate source rather than being powered via power transformer 130.

Within chime unit 110, at least soundmaker 112 and connection block 111 may be present. Soundmaker 112 may be configured to generate one or more different sounds when a doorbell actuation is detected. Soundmaker 112 may be a bell, buzzer, ringer, speaker, or various other forms of a sound generator. In the case of a solenoid type chime unit, the sound generator may be a bell or other mechanical sound generator that uses a solenoid as an electromagnet to magnetically move a physical object to strike another object and make a sound. In the case of an electronic-based chime unit, a speaker that is configured to play a sequence of sounds (e.g., a melody) output by a computerized device (e.g., a processor) may be present. Connection block 111 may permit electrical connectors to be made between components of chime unit 110, doorbells 120, and/or power transformer 130. Connection block 111 may include one or more screws or other fastening components that allow for wires 142, 144, and 145 to be secured to an electrical terminal. Therefore, for example, wire 142 may be run into chime unit 110 and electrically connected with a terminal of connection block 111, which is electrically connected with soundmaker 112. Similarly, for example, wire 145 may be run into chime unit 110 and electrically connected with another terminal of connection block that is electrically connected with soundmaker 112. Each terminal within connection block 111 may be labeled to receive a particular connection (e.g., primary doorbell, secondary doorbell, power transformer).

Monitor module 115 may be a device that can be installed at some time after doorbells 120, power transformer 130, and chime unit 110 have been installed, activated, and used. For instance, monitor module 115 may be added by a person when the person desires to have the doorbell system integrated into a home automation system and to be wirelessly alerted as to a doorbell being actuated. Monitor module 115 may be encased in a housing that has two or more electrical connectors extending from the housing. The electrical connectors, which each can include a wire, and, possibly, some form of connector (e.g., fork terminals), may be configured to be attached to connection block 111. An electrical connection may be made between monitor module 115 and a terminal on connection block 111 for doorbell 120-1. If doorbell 120-2 is present, an electrical connection may be made between monitor module 115 and a terminal on connection block 111 for doorbell 120-2. Another connection may be made to power transformer 130 via another connection on connection block 111. Therefore, by adding the connectors to connection block 111, monitor module 115 may be able to detect when doorbells 120 are actuated. To attach the electrical connectors or wire ends of monitor module 115, a user may partially or fully unscrew (or otherwise disengage) terminals of connection block 111 to allow the electrical connectors to be added to the existing electrical connections between wires 144, 142, 145, and connection block 111. Similarly, connections between soundmaker 112 and connection block 111 may be left unaffected. While monitor module 115 may be connected with power transformer 130, monitor module 115 may use its own power source. As such, performance of the circuit between power transformer 130, doorbells 120, and chime unit 110 may be unaffected by the presence of monitor module 115. In some embodiments, monitor module 115 may be configured to sense whether sufficient power is available at connection block 111. If there is sufficient power (which may be likely if the doorbell system is electronic type), some or all functions of monitor module 115 may be powered via power transformer 130. If there is insufficient power (which may be likely if the doorbell system is a solenoid type), some or all functions of monitor module 115 may be powered via an on-board power source, such as a battery integrated in monitor module 115. Monitor module 115 may be configured to sense whether power is available at the terminals of connection block 111.

Monitor module 115 may be packaged to be small enough to fit within an empty space inside chime unit 110. As such, after making connections to connection block 111, monitor module 115 may be placed within open space in chime unit 110. In some embodiments, adhesive, such as Velcro, glue, one or more screws, or some other form of binding or attachment may be used to secure monitor module 115 within chime unit 110. In other embodiments, monitor module 115 may be left free floating within chime unit 110. A housing of monitor module 115 may be substantially made of plastic (or some other electrically inert material), such as not to interfere with electrical performance of chime unit 110. Once monitor module 115 has been placed in a suitable open space within chime unit 110, a housing of chime unit 110 may be closed, thus concealing monitor module 115. In some embodiments, monitor module 115 may be placed outside of chime unit 110, with wires run into chime unit 110 to connect with connection block 111. In some embodiments, it may be possible that connection block 111 is at least partially external to a housing of chime unit 110. For instance, monitor module 115 may be electrically coupled directly to these wires (e.g., by splicing the wires) outside of chime unit 110. Monitor module 115 may also be placed in or near a particular doorbell to be monitored.

Figure 2:
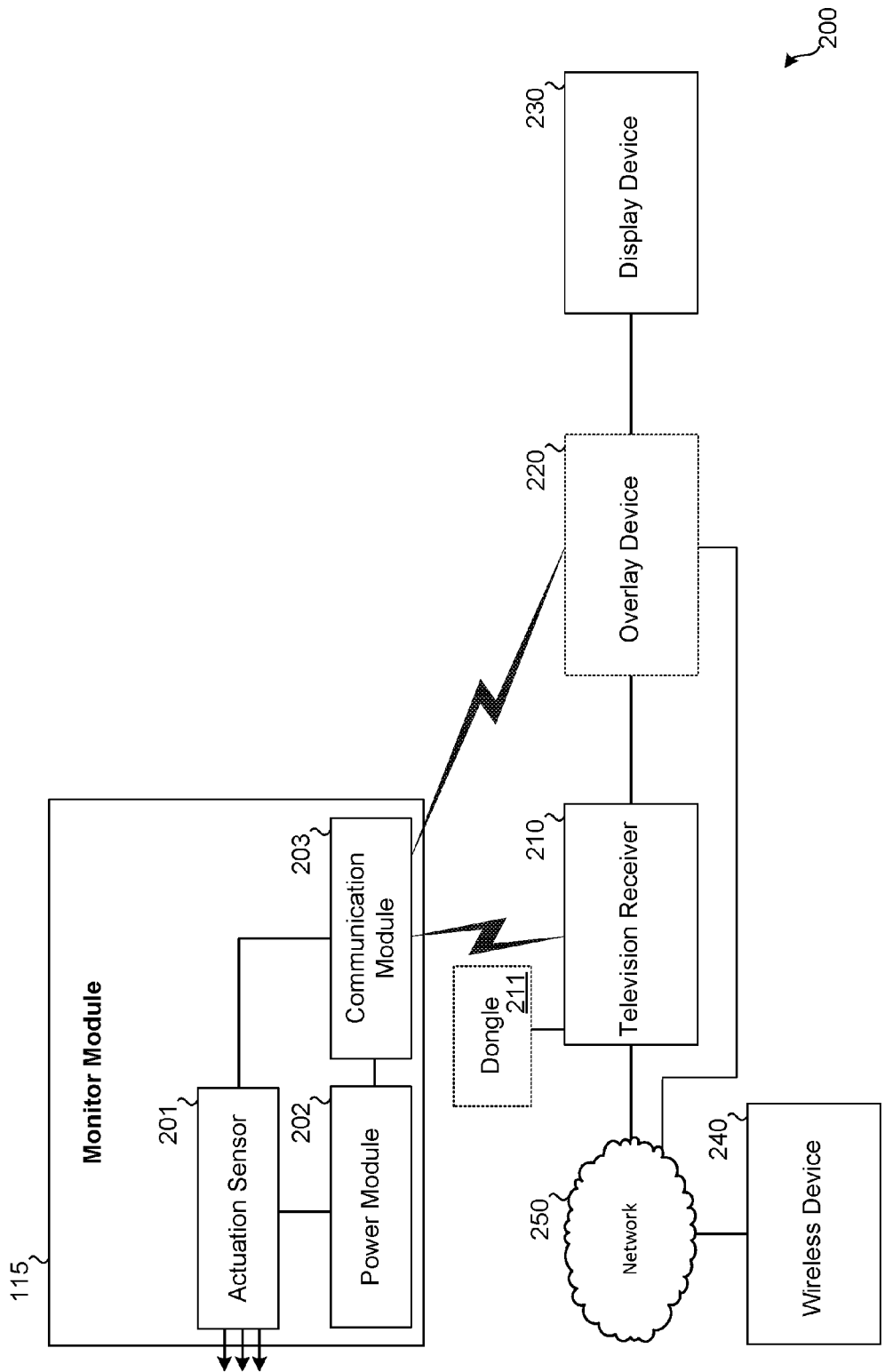
FIG. 2 illustrates an embodiment of a doorbell monitor system integrated as part of a television receiver-based home automation system.

FIG. 2 illustrates an embodiment of a doorbell monitor system 200 integrated in a television receiver-based home automation system. Monitor module 115 of FIG. 1 is illustrated as including various components, including: actuation sensor 201, power module 202, and communication module 203. Actuation sensor 201 may be connected with two or more electrical connectors which were connected with connection block 111 as illustrated in FIG. 1. Actuation sensor 201 may serve to determine when a doorbell of doorbells 120 has been actuated. Actuation sensor 201 may function by determining when a circuit including doorbells 120 has either been completed or broken. Actuation sensor 201, via separate electrical connectors, may distinguish between when a first, second, or some additional doorbell has been actuated. Actuation sensor 201 may receive power from a power module 202. Further, actuation sensor 201 may indicate to communication module 203 that a doorbell, and, possibly, which doorbell, has been pushed. In some embodiments, actuation sensor 201 provides an input to a processor, the input being used to determine whether a doorbell has been actuated. For instance, the input may be a series of pulses; by the processor counting the pulses over a given time period and comparing to the threshold value, it can be determined if the doorbell has been actuated.

Power module 202 may be contained within monitor module 150. Power module 202 may include a battery. As such, monitor module 115 may have its own power source separate from the power source of a chime unit with which it is electrically connected. Power module 202 may be configured to power communication module 203. Communication module 203 may alternatively be powered from the chime terminals if a sufficient amount of power is present (e.g., an electronic-type doorbell). The sense module may derive power from the terminals of the chime unit regardless of the type of doorbell (e.g., electronic or solenoid). Power module 202 may supply power to actuation sensor 201 and communication module 203. As such, monitor module 115 may not be powered off of 110 V AC power. In some embodiments, power module 202 is configured to power actuation sensor 201 and communication module 203 from power collected from a power transformer (via the wires connected with the terminals of the chime unit). Power module 202 may be configured to sense whether sufficient power is available via the terminals of the chime unit (or wires connecting the one or more doorbells). Further detail regarding possible embodiments of power module 202 is provided in relation to FIGS. 5 and 6.

Communication module 203 may receive a input indicative of a doorbell being pressed from actuation sensor 201. Communication module 203 may include one or more processors and may transmit a wireless signal to one or more receiver devices. Communication module 203 may use a variety of different wireless signal protocols to transmit the signal to the receiver device. Communication module 203 may include a communication controller (e.g., a Zigbee® controller) and one or more antennas. For instance, ZigBee® or Z-Wave® compatible signals may be transmitted by communication module 203 to the receiver device using the IEEE 802.15 standard. In other embodiments, some other form of the IEEE 802.15 standard, a local wireless network (e.g., IEEE 802.11a/b/g), WiFi, WiFi Direct, Bluetooth® or some other wireless protocol may be used to transmit wireless signals to a receiver device. The wireless signal transmitted by communication module 203 may vary based on whether a first, second, or some additional doorbell was actuated. For instance, a first wireless signal containing an indication of a first doorbell may be transmitted when doorbell 120-1 is actuated; a second wireless signal containing a second indication of the second doorbell may be transmitted when doorbell 120-2 is actuated.

Depending on embodiment, the receiver device to which communication module 203 transmits an indication may vary. In some embodiments, television receiver 210 may be configured to receive wireless signals from communication module 203 of monitor module 115. Television receiver may include many of the components typically found in a computerized system, such as one or more processors, a computer-readable medium, and one or more wired or wireless communication interfaces. Television receiver 210 may process the received wireless signal from communication module 203. If television receiver 210 is outputting video to a display device 230, television receiver 210 may modify the output video to include an indication of the doorbell actuation (and, possibly, an indication of which doorbell). In some embodiments, the video is modified by overlaying a visual indication of the doorbell actuation. Such video modification may include replacing a portion of the video output to the display device 230 or by overlaying the video output to display device 230 in a semi-transparent manner. In some embodiments the audio signal is also modified to include a sound associated with the doorbell press. Such a sound may be defined by the television receiver, the monitor module, or may be user-defined (e.g., similar to a ringer of a cellular phone).

In some embodiments, television receiver 210 may not be configured to receive signals directly from communication module 203. A separate device, such as a wireless communication device (e.g., dongle 211), may be connected with television receiver 210 via a wired connection. This wireless communication device may serve to receive and/or transmit signals with communication module 203. The wireless communication device may convert the received wireless signals into a format appropriate to be transmitted via wire (e.g., a USB) to television receiver 210. If television receiver 210 is outputting video to a display device 230, television receiver 210 may modify the output video to include an indication of the doorbell actuation (and, possibly, an indication of which doorbell). In some embodiments, the video is modified by overlaying a graphical and/or textual indication of the doorbell actuation. Such video modification may include replacing a portion of the video output to the display device 230 or by overlaying the video output to display device 230 in a semi-transparent manner. In some embodiments the audio signal is also modified to include a sound associated with the doorbell press. Such a sound may be defined by the television receiver, the monitor module, or may be user-defined (e.g., similar to a ringer of a cellular phone).

In some embodiments, television receiver 210, with or without a wireless communication device, may not communicate with communication module 203. Rather, a separate overlay device 220 may be in communication with communication module 203. Such an overlay device 220 may be useful in situations where television receiver 210 is not compatible with a wireless communication device and cannot communicate directly with communication module 203. Overlay device 220 may be configured to be connected between a television receiver 210 and display device 230. Overlay device 220 may process the received wireless signal from communication module 203. If television receiver 210 is outputting video to a display device 230, overlay device 220 may modify the output video to include an indication of the doorbell actuation (and, possibly, an indication of which doorbell). For instance, overlay device 220 may receive an HDMI video input from television receiver 210 and output modified HDMI video to display device 230. In some embodiments, the video is modified by overlaying indication of the doorbell actuation. Such video modification may include replacing a portion of the video output to the display device 230 or by overlaying the video output to display device 230 in a semi-transparent manner. In some embodiments the audio signal is also modified to include a sound associated with the doorbell press. Such a sound may be defined by the television receiver, the monitor module, or may be user-defined (e.g., similar to a ringer of a cellular phone).

While in some embodiments monitor module 115 may communicate with television receiver 210, dongle 211, or overlay device 220, in other embodiments monitor module 115 may communicate with some other device or system that is hosting a home automation system, such as a computer system or cloud-based service.

Display device 230 may represent a television, monitor, or some other visual presentation arrangement configured to receive video from television receiver 210 and/or overlay device 220.

Television receiver 210, overlay device 220, display device 230, wireless device 240 and/or a wireless communication device may be computerized, including computerized components such as one or more processors, one or more non-transitory computer-readable mediums, etc. Television receiver 210 may be further configured to receive and process broadcast television programming. Television receiver 210 may also be configured to record television programming and output on-demand content and an electronic programming guide.

Television receiver 210, a wireless communication device, or overlay device 220 may be further configured to provide one or more wireless devices in indication of the doorbell actuation. In response to receiving the wireless signal indicating the actuation of the doorbell, television receiver 210 or overlay device 220 may transmit an indication via network 250 of one or more wireless devices.

In some embodiments, network 250 may represent one or more public and/or private networks. For instance, network 250 may include a home wireless network and/or the Internet. Television receiver 210 or overlay device 220 may transmit a notification to wireless device 240 directly via network 250 or via a third-party notification server. For instance, a third-party notification server, such as maintained by Apple®, may be used to relay notifications to wireless devices having an associated installed application. Wireless device 240 may represent various forms of wireless devices, such as a cellular phone, tablet computer, laptop, gaming device, etc. Wireless device 240, upon receiving a notification from a third-party server, directly from television receiver 210, or directly from overlay device 220 may present a visual and/or audio notification. Such notifications may be received by one or more wireless devices linked with television receiver 210 or overlay device 220. If the doorbell notification is part of a larger home (or other location) automation scheme, the user of the wireless device 240 may be able to trigger various events, such as the door unlocking, lights turning on, and/or a security camera capturing and recording images in the vicinity of the actuated doorbell.

Television receiver 210 may be triggered to record video via a closed-circuit camera of the area in the vicinity of the doorbell. Television receiver 210 may buffer a rolling window of video from the closed-circuit camera, such as the previous minute. Therefore, a time, before and after the doorbell actuation, could be recorded and stored by television receiver 210 or overlay device 220. Other events may also be triggered by the doorbell being actuated and detected by a monitor module, such as one or more lights turning on or flashing.

Figure 3:
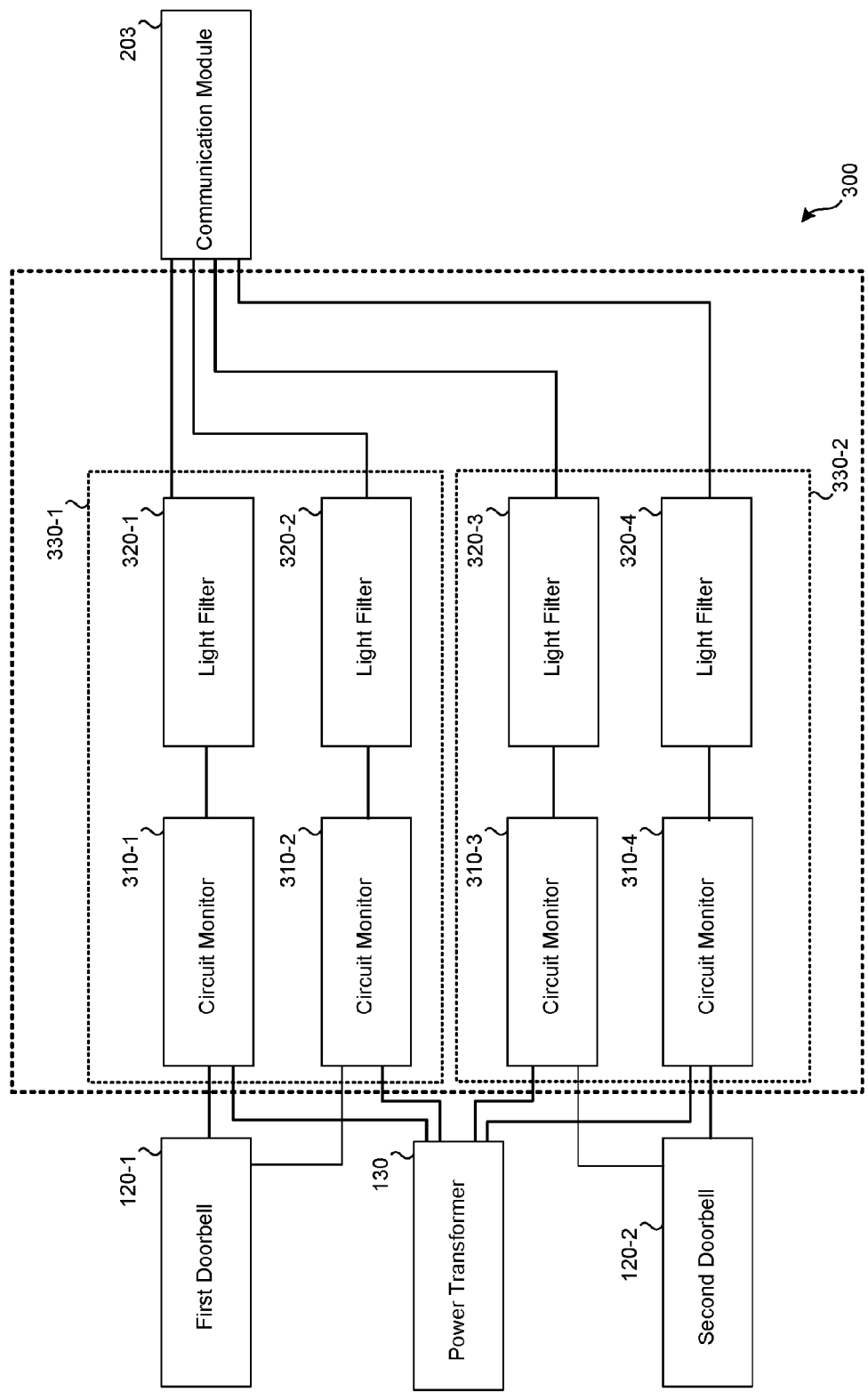
FIG. 3 illustrates an embodiment of an actuation sensor configured to determine when one or more doorbells have been actuated.

FIG. 3 illustrates an embodiment of an actuation sensor 300 configured to determine when one or more doorbells have been actuated. Actuation sensor 300 may represent actuation sensor 201 of FIG. 2 or some other embodiment of the actuation sensor. Actuation sensor 300 is illustrated as connected with doorbell 120-1, doorbell 120-2, and power transformer 130, which are represented in FIG. 1. It should be understood that in some embodiments only doorbell 120-1 and power transformer 130 are connected with actuation sensor 300. In other embodiments, more than two doorbells may be connected with actuation sensor 300.

Sensor paths 330-1 (which includes two paths that compare an output of doorbell 120-1 as compared with an output of power transformer 130) may be used to determine if doorbell 120-1 has been actuated. That is, the output of sensor paths 330-1 may be used by a processor or other form of circuit that is part of communication module 203 to determine if a doorbell has been actuated. Similarly, sensor paths 330-2 (which includes two paths that compare an output of doorbell 120-2 with an output of power transformer 130) may be used to determine if doorbell 120-2 has been actuated. Actuation sensor 300 may be configured to be functional in combination with an electronic type doorbell system and also a solenoid type doorbell system. As such, regardless of whether the user connects the doorbell monitor with an electronic type doorbell system or solenoid type doorbell system, the actuation of doorbell may be detected using actuation sensor 300.

Sensor paths 330-1 may include: circuit monitor 310-1, circuit monitor 310-2, light filter 320-1, and light filter 320-2. Circuit monitors 310-1 and 310-2 may be used to determine when a doorbell has been actuated (e.g., pressed). Circuit monitors 310-1 and 310-2 may include differential amplifiers that are configured to identify a difference in voltage between a transformer terminal and a doorbell wire (e.g., wire 142). The two paths in sensor path 330-1 may represent two matching differential amplifier circuits with swapped inputs. Only one of the paths may need to be indicative of a doorbell actuation for it to be determined by communication module 203 that a doorbell actuation has occurred. Separate paths may be present because if the doorbell system is an electronic system it may not be known which direction the cathode and anode of the diode is oriented in the doorbell circuit.

Light filters 320-1 and 320-2 may be present for both paths within sensor paths 330-1. Each light filter may serve to help eliminate a false detection of a doorbell actuation due to current flowing through the doorbell such as due to the presence of a light, such as a light bulb, within the doorbell. For instance, in a solenoid type doorbell system, the circuit may only be fully closed, with little voltage drop across the doorbell, when a person actuates the doorbell. However, at least some current may be flowing through the circuit in order to allow a light of the doorbell to illuminate. For instance, many doorbell systems use small incandescent bulbs that illuminate using the alternating current present in the doorbell system in a solenoid type system.

Sensor paths 330-2 may function similarly to sensor paths 330-1, except may detect actuations of doorbell 120-2 rather than doorbell 120-1. Additional sensor paths 330 may be added to detect additional doorbells. The outputs of sensor paths 330 may be output to communication module 203. Based on which doorbell is determined as being actuated, a message that indicates as such may be created and transmitted to a home automation host system, such as a television receiver or overlay device.

Figure 4:
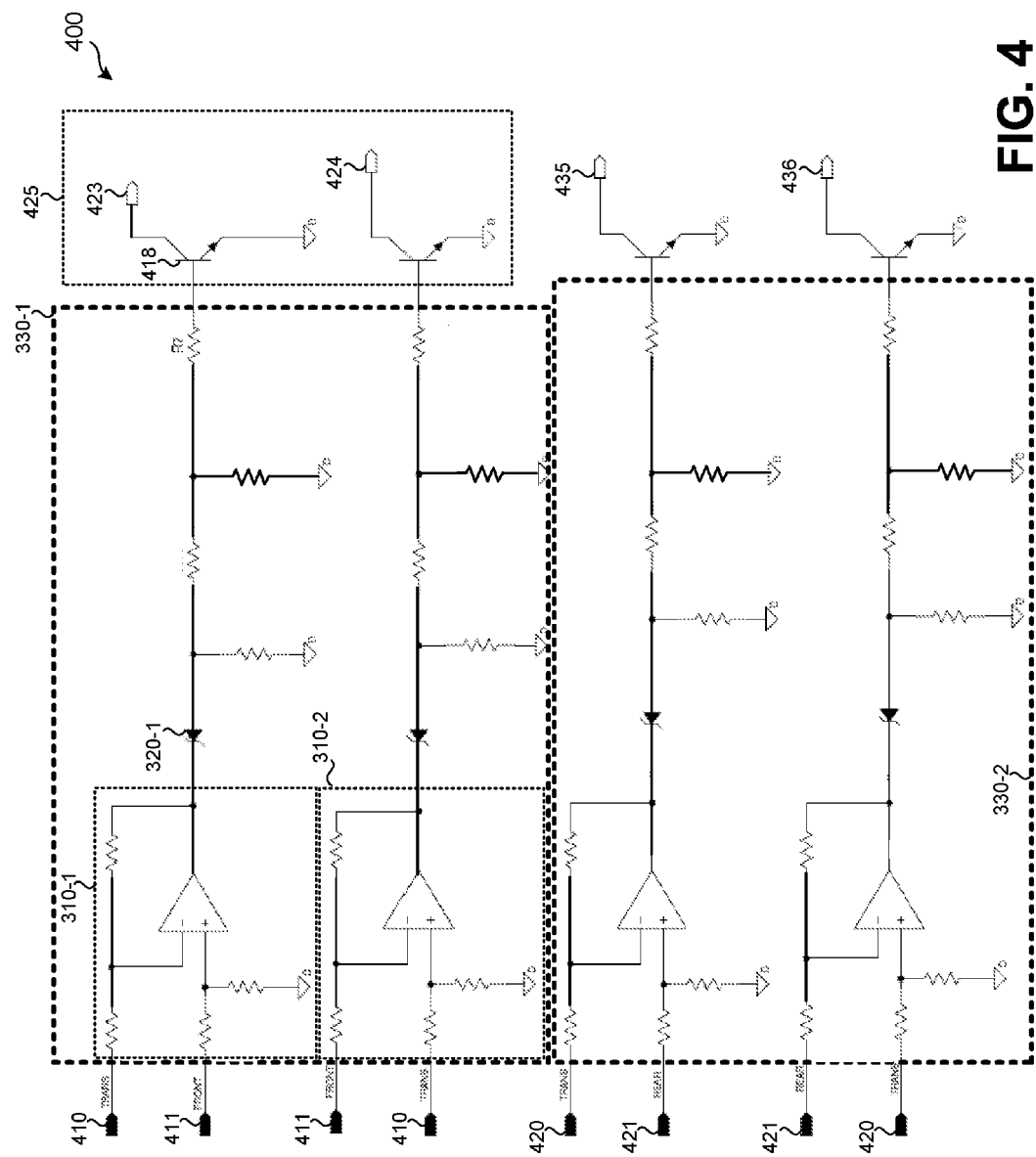
FIG. 4 illustrates an embodiment of a circuit diagram of an actuation sensor configured to determine when one or more doorbells have been actuated.

FIG. 4 illustrates an embodiment 400 of a circuit diagram of an actuation sensor configured to determine when one or more doorbells have been actuated. Embodiment 400 may represent a more detailed illustration of actuation sensor 300 of FIG. 3 and/or actuation sensor 201 of FIG. 2. For instance, circuit monitor 310-1 may be a differential comparator that outputs an indication of the difference in voltage between input 410 and input 411. The second path for circuit monitor 310-2 may use reversed inputs of input 410 and input 411, as illustrated, to a differential comparator circuit.

In an electronic type doorbell, a half wave may be passed through a diode at the doorbell when the doorbell is not actuated. However, it may be unknown whether the diode is blocking the positive or negative half of the AC signal from being transmitted. As such, for half the time, the half-wave signal that passes through the doorbell (and is present at the input 411) will match the full-wave AC signal from the transformer at input 410. Therefore, the output of circuit monitor 310-1 will be zero when the signals match, but will output a positive voltage half wave indicative of the difference between the inputs 410 and 411 when the signals do not match. This difference will cause the gate of transistor 418 to be periodically activated and tie output 423 to ground. Output 423 may be connected with a pull-up resistor. As such, output 423 will appear to be a train of pulses at 60 Hz (or whatever the frequency of the AC power source is) when the electronic type doorbell is not actuated.

Since the output of circuit monitors 310 are only going to half waves (either being positive or negative in voltage), both of circuit monitors 310 may be necessary. This may be true because a negative half wave output by one of circuit monitors 310 for an electronic type doorbell monitor may not cause its transistor (e.g., transistor 418) to switch, such as because a voltage at zero or below will keep its output disconnected from ground. As such, the processor may be counting for pulses to be present on output 423 or output 424. When pulses are present on at least one of the outputs, then the doorbell may not be actuated.

Generally, for embodiment 400, both outputs for a given doorbell are required to be logically zero for a doorbell actuation to be detected by a microcontroller connected with the outputs (which may be part of the communication module). Therefore, if a pulse train is present on one output and a logical zero is present on the other output for a doorbell, a doorbell actuation is detected. A pulse train being detected on both outputs for a doorbell may also be indicative of a doorbell press. However, if either output stays logically high, no doorbell actuation is detected.

In an electronic-type doorbell system, when the doorbell is actuated, the diode at the doorbell may be bypassed, allowing the full-wave AC signal to pass through the doorbell. As such, the signal received at input 410 will match the signal at input 410. Thus, the output of each differential comparator of circuit monitor 310-1 will be a pulse train. The pulsing voltage from the differential comparator of circuit monitor 210-1 will result in the connected transistor periodically pulling output 423 to logic "0". By a microprocessor connected with outputs 423 and 424 counting received pulses, when the number of pulses received the outputs reaches a threshold level, such as at least 10 (per second), it may be determined that the doorbell has been actuated. Table 1 provides a listing of various rules which may be used to determine if a button press has occurred. Such rules may be applicable to electronic-type and solenoid-type doorbells.

TABLE 1

| Condition at Outputs | Button Press |
| --- | --- |
| Pulse train on output 423 and output 424 | Yes |
| Pulse train on output 423, output 424 is constant logic "0" | Yes |
| Pulse train on output 424, output 423 is constant logic "0" | Yes |
| Pulse train on output 423, output 424 is constant logic "1" | No |
| Pulse train on output 424, output 423 is constant logic "1" | No |
| Output 423 is constant logic "0", output 424 is constant logic "1" | No |
| Output 423 is constant logic "1", output 424 is constant logic "0" | No |

TABLE 1-continued

| Condition at Outputs | Button Press |
| --- | --- |
| Output 423 is constant logic "0", output 424 is constant logic "0" | Yes |
| Output 423 is constant logic "1", output 424 is constant logic "1" | No |

In a solenoid-type doorbell system, no form of AC wave is output from circuit monitor 310-1 when the doorbell is not actuated. This may result in transistors 425 not being activated and outputs 423 and 424 each being pulled to logic "1" when the doorbell is not actuated. While the doorbell is being actuated in such a system, inputs 410 and 411 may each have pulse trains output from the circuit monitors 310, thus outputs 423 and 424 will be pulse trains. As such, if at least a threshold number of pulses are received on either output 423 or 424 by a processor over a given time (e.g., one second) in a solenoid doorbell system, it may be determined that the doorbell has been actuated.

A Zener diode may be used as light filter 320-1. Such a Zener diode may be configured to block any voltage below a threshold value, such as 5.6 V, from triggering a transistor to tie its output low. Even when a doorbell is not actuated, the doorbell may allow some current to flow through the circuit between, for example, the wires represented by inputs 410 and 411 to allow a light to be illuminated. A small voltage that is output by circuit monitor 310-1, such as due to the presence of a light at the doorbell allowing some current to flow through the doorbell circuit, may be blocked from activating either of transistors 425. Zener diodes, or some other component or group of components configured to block up to a particular voltage, may be used as the other light filters.

Sensor paths 330-2 may be used to detect actuation of a second doorbell in a similar way as sensor paths 330-1 for the first doorbell. Pulses on outputs 435 and/or 436 may be counted to determine if the second doorbell has been actuated. Communication module 203 may be triggered to create and transmit a message to a home automation system indicating that a doorbell electrically connected with inputs 420 and 421 has been actuated when the pulse count drops below a stored threshold value over a given time period. Outputs 435 and 436 are tied to different inputs of communication module 203 than outputs 423 and 424.

Figure 5:
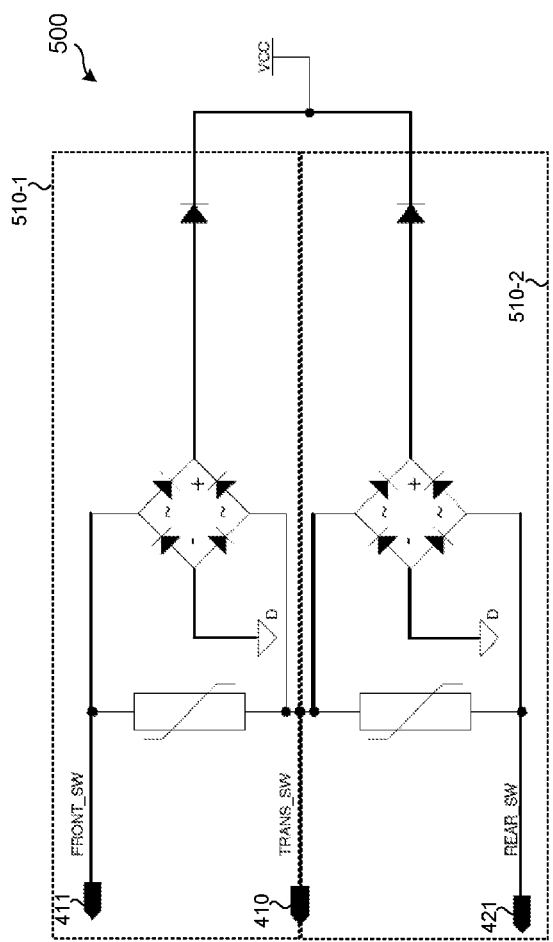
FIG. 5 illustrates an embodiment of a circuit diagram of a portion of a power module.

FIG. 5 illustrates an embodiment 500 of a circuit diagram of a portion of a power module. Embodiment 500, which represents a subsystem of a power module, such as power module 202 of FIG. 2, may be configured to convert an alternating current voltage supplied by a power transformer, such as power transformer 130 of FIG. 1, to power other components of a monitor module, such as monitor module 115. Embodiment 500 may be referred to as a power converter. The illustrated portion of the power module may couple with the terminals of the chime unit (or otherwise coupled with the wires connected with the power transformer and doorbells of a doorbell system). Embodiment 500 may be configured to allow a 16 V AC power source to be converted to a DC power source to power components of a doorbell monitor module. In order for embodiment 500 to derive power from the terminals of the chime unit, only one of sections 510-1 and 510-2 may be required to be connected. Having both connected may provide the same rectified output as if only one of sections 510-1 and 510-2 are connected. Embodiment 500 may function when an electronic type doorbell circuit is present, such as an electronic type doorbell circuit that functions using a 16 V alternating current and allows a half wave to pass through the doorbell when the doorbell is not actuated. Power may not be derived from a solenoid-based system because the circuit is open when the doorbell is not actuated (and no diode is present at the doorbell that permits current to flow). By having both section 510-1 and section 510-2, power may be derived from the terminals of the chime unit regardless of whether only a first doorbell is connected, only a second doorbell is connected, or both doorbells are connected. Such sections may involve the use of the diode bridge such that only positive voltages are output by sections 510-1 and 510-2 to create a rectified voltage output. It should be understood that additional sections 510 may be included if the monitor unit is configured to monitor for actuation of additional doorbells. Further, in other embodiments, only a single section 510-1 may be present. If the doorbell system is of the electronic type, embodiment 500 may not successfully derive power from the terminals of the doorbell system.

It should be understood that the positive voltage output by embodiment 500 may be further conditioned and brought to an appropriate DC voltage level, such as 3.3 V, suitable for powering components of the doorbell monitor, such as a communication module. Components, such as a DC-to-DC converter, to condition the voltage and current output by embodiment 500, have not been presented for simplicity.

Figure 6:
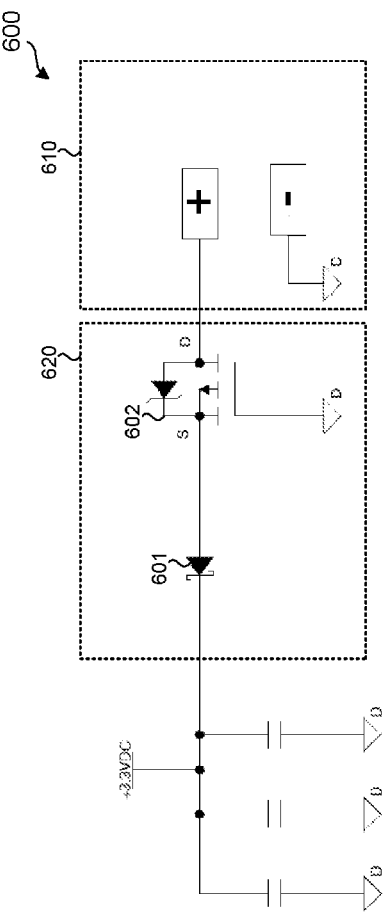
FIG. 6 illustrates an embodiment of a circuit diagram of another portion of a power module.

FIG. 6 illustrates an embodiment 600 of a circuit diagram of another portion of a power module. Embodiment 600, which represents a subsystem of a power module, such as power module 202 of FIG. 2, may be configured to disconnect any onboard batteries of the doorbell monitor if embodiment 500 is producing a sufficient voltage to power the doorbell monitor or if batteries are installed with an incorrect polarity.

Battery terminals 610 may be isolated from the doorbell monitors DC voltage supply by one or more components, such as diode 601 and transistor 602. The diode 601, which may be a Shottky diode, may serve to electrically disconnect the battery terminals if a greater voltage is present at the cathode of the diode. As such, if power is being successfully derived from the terminals of the chime unit by embodiment 500, battery terminals 610 will be electrically disconnected, regardless of if batteries are present and charged. For instance, the batteries to be coupled with battery terminals 610 may be configured to only have a voltage of 3 V, while if embodiment 500 successfully derives power from the terminals of the chime unit from the transformer, 3.3 V will be present at the cathode of diode 601.

CMOS transistor 602 may be present to ensure that, if batteries are installed in battery terminals 610, the batteries are installed with the proper polarity. If the batteries are installed with the reverse polarity, transistor 602 may ensure that the batteries are electrically disconnected from the remainder of the circuit, preventing potential damage to the doorbell monitor and/or the batteries. If batteries connected with battery terminal 610 are connected with the proper polarity, the batteries may be electrically connected with the anode of diode 601.

While diode 601 and transistor 602 may be present to electrically disconnect the battery terminals under certain conditions, it should be understood that other types of logical components may be used to perform similar functions.

Figure 7:
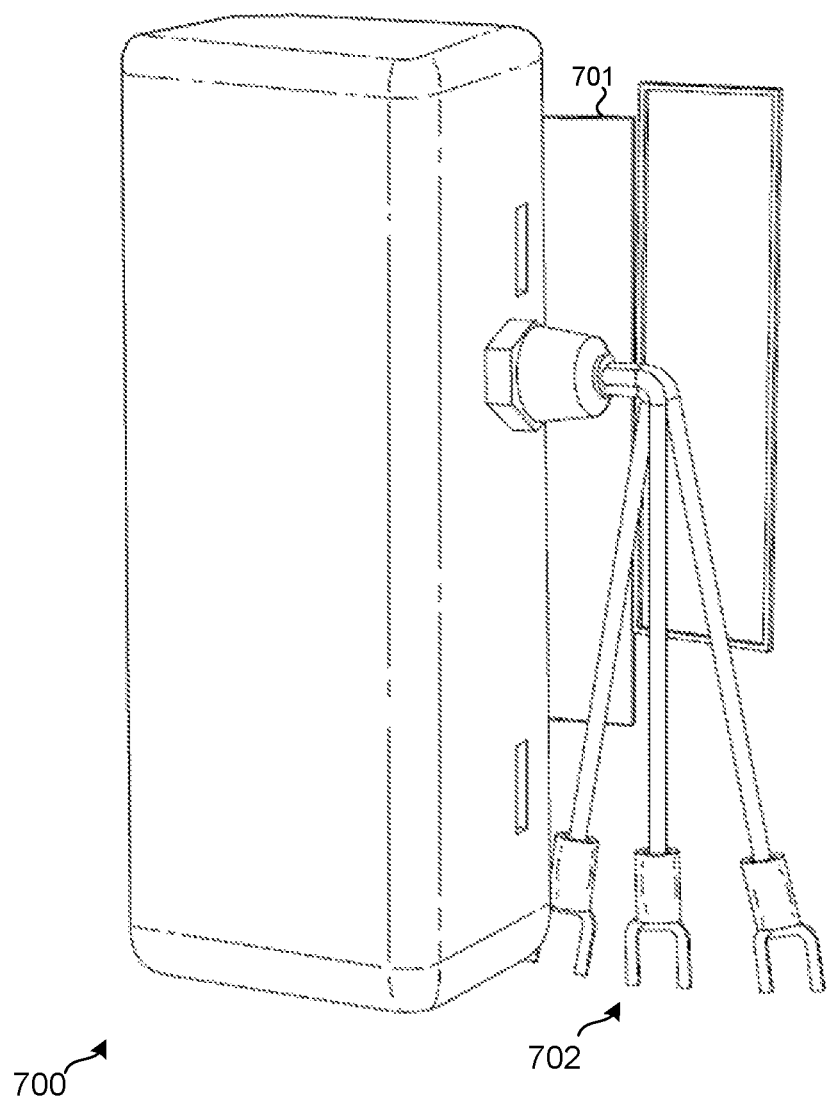
FIG. 7 presents an embodiment of a doorbell monitor system configured to be installed within a chime unit of a doorbell system.

FIG. 7 presents a drawing of an embodiment of a doorbell monitor system. Monitor module 700 represents an embodiment of monitor module 115. As can be seen in the illustrated embodiment, monitor module 700 is housed in plastic with three wires and associated electrical connectors extending from monitor module 700. In some embodiments, monitor module 700 may only have two wires with associated connectors (such as fork terminals or bare wire ends). In the illustrated embodiment of monitor module 700, a mounting bracket 701 is present to secure monitor module 700 within a chime unit of the doorbell system. The electrical connectors 702 (e.g., fork terminals) of the monitor module 700 may be connected to a connection block of the chime unit.

Figure 8:
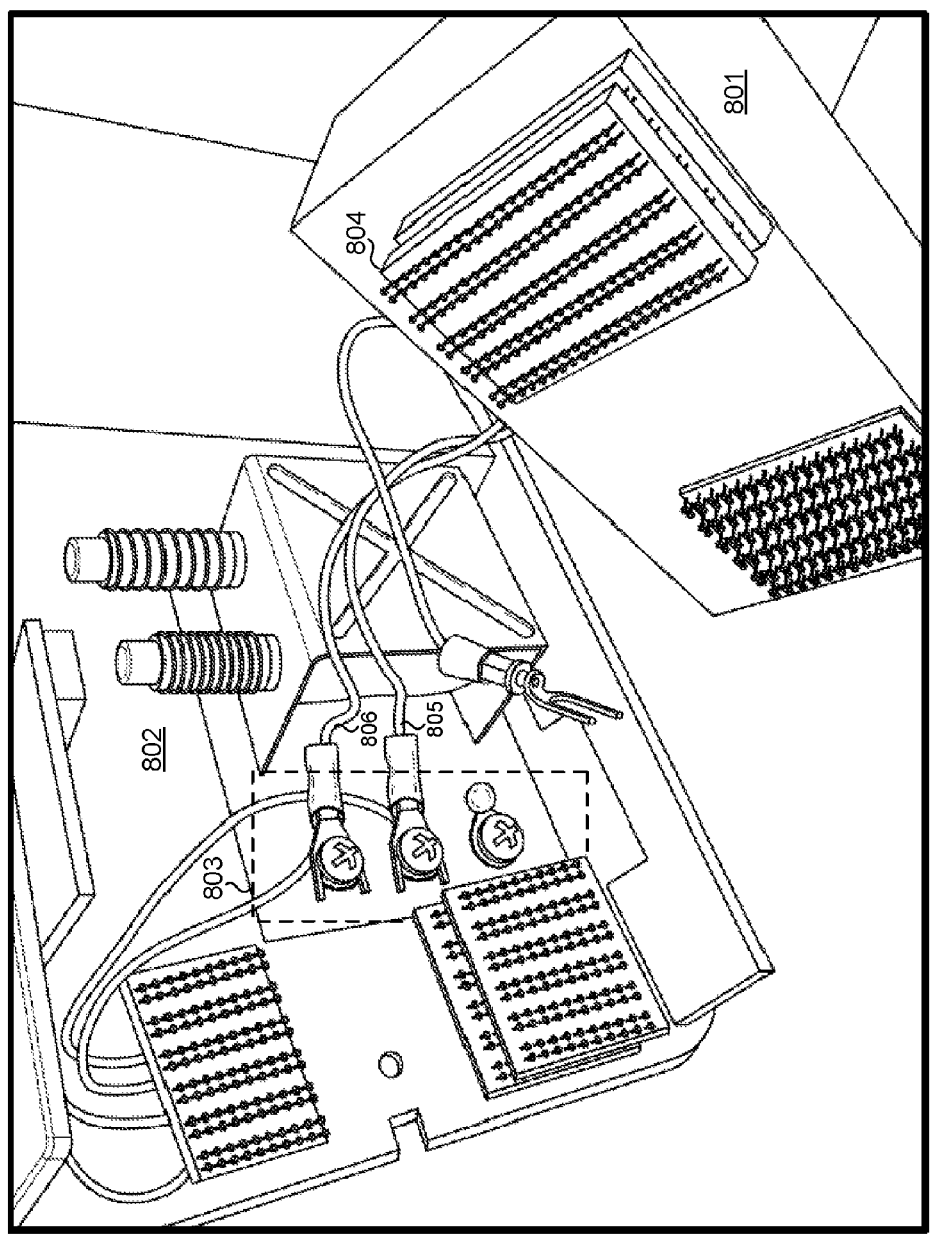
FIG. 8 presents a picture of an embodiment of a monitor module connected with terminals of a chime unit of a doorbell system.

FIG. 8 presents a drawing of an embodiment 800 of a doorbell monitor module 801 (which may be represented by the previously detailed monitor modules) with a doorbell chime unit 802 (which may be represented by the previously detailed chime units). In this illustrated embodiment, the connection block of the chime unit includes three screw-based terminals 803 to which the wires 805 and 806 of the monitor module are electrically coupled. Embodiments may also have only two wires coupled with the monitor module (to detect a single doorbell). Similarly, if for a single doorbell, the chime unit may only have two terminals on its connection block. To be clear, a connection block refers to the group of two or more terminals within or otherwise part of a chime unit that allows for an electrical connection between the wiring of a doorbell (and, possibly, a transformer) and the components of the chime unit. This embodiment of a monitor module can be secured within the chime unit via Velcro 804. The unconnected wire may be unconnected because a second doorbell is not in service in this exemplary configuration. In this embodiment, once secured via Velcro (or other attachment means or simply placed within the chime unit), a housing of the chime unit may be closed, thus concealing the doorbell monitor module within the chime unit.

Figure 9:
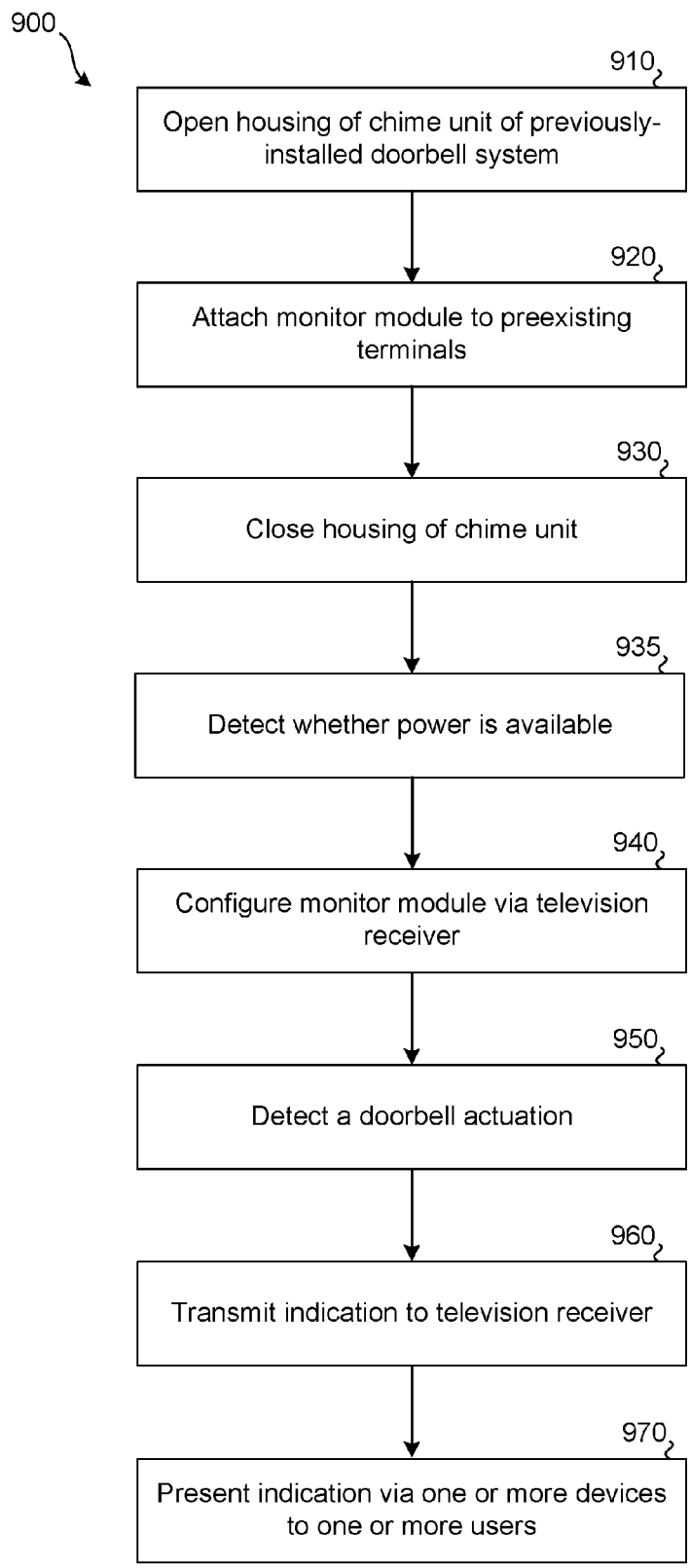
FIG. 9 illustrates an embodiment of a method for installing and using a monitor unit as part of a doorbell system.

FIG. 9 illustrates an embodiment of a method 900 for installing and using a doorbell monitor system. Method 900 may be performed using the systems and devices detailed in relation to FIGS. 1-4. While method 900 represents a method for installing and using the doorbell monitor system, it should be understood that method 900 may be broken into multiple methods, such as a method for installing, a method for configuring, and a method for using the doorbell monitor system.

At step 910, a chime unit of a previously installed doorbell system may be accessed. The chime unit may be accessed by removing a housing of the chime unit. In some embodiments, rather than accessing the chime unit, the wires that connect a doorbell, transformer, and chime unit may be accessed at another location, such as at a doorbell or at some point along where the wires are run between the doorbell(s) and the chime unit. At step 920, electrical connectors of the monitor module may be coupled with the preexisting terminals of a connection block of the previously installed chime unit. Electrical connections already present on the connection block between one or more doorbells, a transformer, and/or the chime unit may be left intact. Alternatively, the wires may be spliced or accessed at the doorbell in order to connect the doorbell monitor module. At step 930, the chime unit may be closed with the monitor module inside. In other embodiments, the monitor module may be kept external to the chime unit.

At block 935, using circuits similar to the embodiments presented in FIGS. 5 and 6, the doorbell monitor module may sense whether it is possible to generate a sufficient DC voltage from the connections with the terminals of the chime unit (or other form of connection) to the transformer. If so, one or more battery terminals of the doorbell monitor may be electrically disconnected, such that power from the transformer is used to power the doorbell monitor. If not, the battery terminals may remain connected such that one or more batteries are used to power the doorbell monitor.

At step 940, the monitor module may be configured, such as using a television receiver. This configuration may involve the television receiver being informed as to the existence of the monitor module. In some embodiments, the monitor module may have an actuator that can be depressed in order to make the monitor module discoverable. In such embodiments, the configuration step 940 may be performed before closing the housing of the chime unit and/or before attaching the monitor module to the terminals of the chime unit.

At step 950, the doorbell monitor module may detect a doorbell actuation. Such detection may occur based on a circuit between a transformer, the doorbell, and the chime unit being opened or closed. Detection may be performed by an actuation circuit, such as presented in FIG. 3 or 4, such that the doorbell system may either be an electronic-type doorbell system or a solenoid type doorbell system. The monitor module may detect this actuation based on monitoring a current, voltage, or resistance at the connection block or other point where the doorbell monitor module is connected with the doorbell system. At step 960, an indication may be transmitted to the television receiver of the doorbell actuation. In some embodiments, rather than transmitting to the television receiver, the indication may be transmitted to an overlay device, a wireless communication device connected with a television receiver, or some other form of home automation host system. The indication transmitted may specify a particular doorbell. At step 970, an indication as to the doorbell being actuated may be presented to one or more users. If the television receiver is actively being used (e.g., is in a powered up output mode that results in video being output to a display device), an indication may be output to a display device for presentation to a user. The indication may involve modification of video and/or audio being output by the display device. One or more indications may also be transmitted to and presented by one or more wireless devices which may be in use within the structure or remotely.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A doorbell monitor device, comprising:
a plurality of electrical connectors configured to be attached with a plurality of terminals of a chime unit;
an actuation sensor configured to sense an actuation of a doorbell in communication with the chime unit via the plurality of electrical connectors;
a communication module configured to transmit a wireless signal indicative of the actuation of the doorbell; and
a power circuit that converts an alternating current (AC) signal, received via the plurality of electrical connectors and the plurality of terminals of the chime unit, to a direct current (DC) output, wherein:
the direct current output powers the actuation sensor and the communication module; and
the power circuit comprises a diode bridge to isolate a positive voltage of the AC signal received via the plurality of terminals of the chime unit.

2. The doorbell monitoring device of claim 1, wherein the plurality of terminals of the chime unit comprise a doorbell input terminal and a transformer terminal.

3. The doorbell monitoring device of claim 1, wherein the power circuit comprises the diode bridge and a second diode bridge, wherein the first diode bridge and the second diode bridge each isolate a positive voltage of the AC signal received via the plurality of terminals of the chime unit.

4. The doorbell monitoring device of claim 3, wherein the diode bridge and the second diode bridge are electrically connected to a common output.

5. A doorbell monitor device, comprising:
a plurality of electrical connectors configured to be attached with a plurality of terminals of a chime unit;
an actuation sensor configured to sense an actuation of a doorbell in communication with the chime unit via the plurality of electrical connectors;
a communication module configured to transmit a wireless signal indicative of the actuation of the doorbell; and
a power circuit that converts an alternating current (AC) signal, received via the plurality of electrical connectors and the plurality of terminals of the chime unit, to a direct current (DC) output, wherein:
the direct current output powers the actuation sensor and the communication module; and
the power circuit further comprises battery terminals and a disconnect circuit that electrically disconnects the battery terminals from the DC output if a first DC voltage at the DC output is greater than a second DC voltage across the battery terminals.

6. The doorbell monitoring device of claim 5, wherein the disconnect circuit comprises a Shottky diode.

7. The doorbell monitor device of claim 5, wherein the power circuit further comprises a battery isolation circuit that electrically disconnects the battery terminals when one or more batteries are connected with the battery terminals and have a reverse polarity.

8. The doorbell monitor device of claim 1, further comprising a housing, configured to encase the actuation sensor, the power circuit, and the communication module, wherein the housing is configured to be placed within the chime unit and is configured to permit the plurality of electrical connectors to be attached with the terminals of the chime unit.

9. The doorbell monitor device of claim 1, wherein:
the actuation sensor is further configured to sense a second actuation of a second doorbell; and
the communication module is further configured to transmit a second wireless signal indicative of the second actuation.

10. The doorbell monitor device of claim 1, wherein the AC signal is 16 V.

11. A doorbell monitor system, comprising:
a doorbell monitor device, comprising:
a plurality of electrical connectors configured to be attached with terminals of a chime unit;
an actuation sensor configured to sense an actuation of a doorbell in communication with the chime unit via the plurality of electrical connectors;
a communication module configured to transmit a wireless signal indicative of the actuation of the doorbell; and
a power circuit that converts an alternating current (AC) signal received via the plurality of electrical connectors to a direct current (DC) output, the direct current output powers the actuation sensor and the communication module, wherein the power circuit comprises a diode bridge to isolate a positive voltage of the AC signal received via the terminals of the chime unit; and
a remote computerized device configured to receive the wireless signal indicative of the actuation of the doorbell and output an indication of the actuation of the doorbell to a user.

12. The doorbell monitoring system of claim 11, wherein the terminals of the chime unit comprise a doorbell input terminal and a transformer terminal.

13. The doorbell monitoring system of claim 11, wherein the power circuit of the doorbell monitor device comprises the first diode bridge and a second diode bridge, wherein the diode bridge and the second diode bridge each isolate a positive voltage of the AC signal received via the terminals of the chime unit.

14. The doorbell monitoring system of claim 13, wherein the diode bridge and the second diode bridge are electrically connected to a common output.

15. The doorbell monitoring system of claim 11, wherein the
power circuit further comprises battery terminals and a disconnect circuit that electrically disconnects the battery terminals from the DC output in response to a first DC voltage at the DC output being greater than a second DC voltage across the battery terminals.

16. The doorbell monitor system of claim 15, wherein the power circuit further comprises a battery isolation circuit that electrically disconnects the battery terminals in response to one or more batteries connected with the battery terminals having a reverse polarity.

17. The doorbell monitoring system of claim 11, wherein the remote computerized device is part of a home automation system and outputs the indication of the actuation of the doorbell as a visual indication on an electronic display.

18. The doorbell monitor system of claim 11, wherein the doorbell monitor device further comprises a housing, configured to encase the actuation sensor, the power circuit, and the communication module, wherein the housing is configured to be placed within the chime unit and is configured to permit the plurality of electrical connectors to be attached with the terminals of the chime unit.

* * * * *